United States Patent [19]

Katona

[11] Patent Number: 5,033,723
[45] Date of Patent: Jul. 23, 1991

[54] BAND SAW BLADE WELDING JIG

[76] Inventor: Joseph R. Katona, 3398 Aquinas, Rochester, Mich. 48309

[21] Appl. No.: 578,143

[22] Filed: Sep. 6, 1990

[51] Int. Cl.$^5$ .............................................. B32B 1/00
[52] U.S. Cl. .................................. 269/87.2; 269/219; 269/243
[58] Field of Search .................. 269/87, 88, 160, 221, 269/43, 296, 246, 265, 269, 257, 290, 293, 901, 303, 243; 76/78 R, 78 A; 228/49 R, 49 C; 51/221 BS

[56] References Cited

U.S. PATENT DOCUMENTS

| 723,789 | 3/1903 | Walter . | |
|---|---|---|---|
| 1,407,188 | 2/1922 | Coemack . | |
| 2,254,999 | 9/1941 | Gereau | 269/243 |
| 2,713,275 | 7/1955 | Gregston . | |
| 4,109,900 | 8/1978 | Vandecoevering . | |
| 4,116,425 | 9/1978 | Pesola | 269/243 |
| 4,342,450 | 8/1982 | Maddock . | |
| 4,561,163 | 12/1985 | Cox | 269/243 |
| 4,889,330 | 12/1989 | McSwain | 269/219 |

OTHER PUBLICATIONS

DeCristoforo, R. J., "The Band Saw Book with 20 Projects", Tab Books Inc., 1989, pp. 61-62.

Primary Examiner—Robert C. Watson
Attorney, Agent, or Firm—Shlesinger Arkwright & Garvey

[57] ABSTRACT

A band saw blade welding jig for use in soldering which holds the band saw blade portions securely during the welding operation. The welding jig includes a base upon which the band saw blade portion rest and clamps for holding the band saw blades in position against the base member and a fence during the welding operation. The fence is adjustable toward and away from one edge of the base member. The adjustability of the fence is achieved through the use of a plurality of elongated slots located in either the base member, the fence or both members.

13 Claims, 1 Drawing Sheet

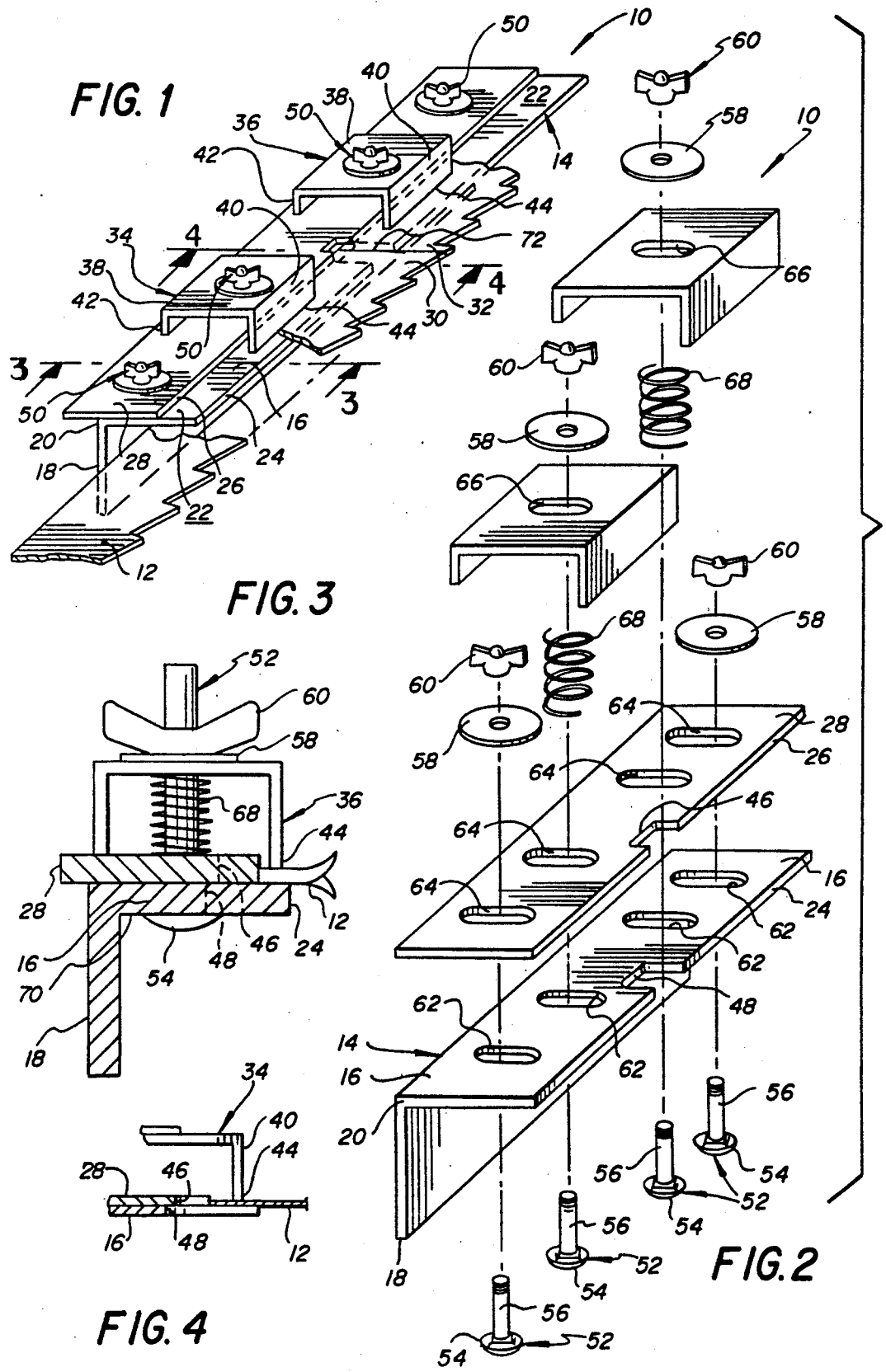

5,033,723

BAND SAW BLADE WELDING JIG

FIELD OF THE INVENTION

This invention is related to a device for holding two ends of a band saw blade together during welding, to include soldering, brazing and the like. It should be understood that the jig could be used to retain other items.

BACKGROUND OF THE INVENTION

Band saw blades are generally formed of a loop of thin, flexible steel forming a having one toothed edge for cutting and one flat edge. Band saw blades are generally cut from a long strip of blade material which is then welded to specific lengths for sale to blade purchasers, however it is possible to purchase such blade material in strips prior to welding.

Due to the thinness of the blade material, breakage of the saw blade is an all to frequent occurrence. Replacement or repair of broken blades usually involves substantial interruption to take the broken saw blade to a saw repair facility for mending or requires purchase of a new blade.

The convenience and cost savings of the ability to repair one's own blades in their own shop is provided by the present invention.

OBJECTS AND SUMMARY OF THE INVENTION

A primary object of the invention is to provide a band saw welding jig for making and repairing band saw blades by holding the separated blade sections together during the welding operation.

Another object of the invention is to provide a saw blade holder which is adjustable so that band saw blades of varying widths can be held for welding.

Yet another object of the invention is to provide a saw blade welding jig which can be used by home hobbyist because it can be made inexpensively and has relatively few parts.

Still another object of the invention is that the band saw blade welding jig can be constructed without the need for specially molded or customized parts.

In summary, therefore, this invention is directed to a band saw blade welding jig which can be used by the home hobbyist to make and repair their own blades. The welding jig includes slots which provide adjustability of the fence relative to the blade supporting surface, whereby blades of varying width can be welded together by silver soldering. A slot is formed in both the fence member and the blade support portion to reduce heat convection from the saw blade through the jig. The welding jig includes a depending arm which allows the jig itself to be supported on a vice for welding and for grinding or filing the blade prior to welding and filing the weld to create a smooth surface on the blade after welding. These and other objects an advantages of the invention will be readily apparent in view of the following description and drawings of the above-described invention.

BRIEF DESCRIPTION OF THE DRAWINGS

FIG. 1 is a perspective view showing the welding jig holding a saw blade clamped in position for welding, portions of the saw blade have been broken away to reveal portions of the jig;

FIG. 2, is an exploded view of the saw blade welding jig;

FIG. 3, is a sectional view of the welding jig holding a saw blade taken along lines 3—3 of FIG. 1; and, FIG. 4 is a sectional view of the welding jig holding a saw blade in position for welding taken along lines 4—4 of FIG. 1.

DETAILED DESCRIPTION OF THE INVENTION

The welding jig 10 is shown in FIG. 1 holding a band saw blade 12 resting on a support base 14 which is preferably formed of a length of angle iron having a pair of legs 16 and 18 which meet along a common edge 20 in a generally perpendicular relationship. Support base 14 includes a support surface 22 upon which the saw blade 12 rests. Support surface 22 extends from a generally straight front edge 24 of support base leg 16 to a front edge 26 of a fence member 28.

Fence 28 is formed of a generally flat elongated member which is adjustably secured to support base leg 16. Saw blade 12 rests on support surface 22 and abuts edge 26 so that saw blade ends 30 and 32 can be aligned. Saw blade ends 30 and 32 are held in position by clamping members 34 and 36. Each clamping member is generally a U-shaped unit having a central portion 38 extending generally parallel to the fence 28 and support base leg 16. Each clamping member 34 and 36 includes a clamping leg 40 and a support leg 42. Support leg 42 extends generally perpendicularly from central portion 38 and rests on fence 28. Clamping leg 40 extends generally perpendicularly from the opposite side of central portion 38 and extends downwardly to engage saw blade 12 to sandwich saw blade 12 between clamping edge 44 of clamping leg 40 and support surface 22. Clamping leg 40 is preferably slightly longer than support leg 42 so that central portion 38 remains parallel to support base leg 16.

Saw blade ends 30 and 32 are clamped in position centrally of recess 46 of fence 28 and recess 48 of support base leg 16. Clamping members 34 and 36 are held in position by fasteners 50 which in turn hold saw blade ends 30 and 32 in their proper positions.

As best shown in FIG. 2 fasteners 50 preferably include carriage bolts 52 having heads 54 and a threaded shank 56. Each fastener also includes a washer 58 and a threaded wing nut 60. Other bolts and fasteners could be used, but wing nuts allow easy finger manipulation for tightening and releasing clamping members 34 and 36.

As shown in FIG. 2, the support base leg 16 includes a plurality of slotted holes 62 extending therethrough which are spaced centrally between and extend perpendicularly to common edge 20 and front edge 24. Slotted holes 62 are spaced laterally of the recess 48 of support base leg 16. Fence 28 also preferably includes slotted holes 64 which are alignable with slotted holes 62 of support base leg 16. Clamping members 34 and 36 each include slotted holes 66 which are alignable with one of holes 62 in support base leg 16 and with slotted holes 64 of fence 28. Shanks 52 of fasteners 50 are inserted through slotted holes 66, 64 and 62 and are secured by washers 58 and wing nuts 60 to secure the support base 14 to fence 28 and to clamping members 34 and 36. Preferably, fasteners 50 are also used to secure fence 28 to support base 14.

Slotted holes 62, 64 and 66 allow adjustability between the support base 14, fence 28 and clamping members 34 and 36 by allowing sliding movement of support base 14 and fence 28 relative to each other and also allow relative movement between support base 14 and clamping members 34 and 36 as well as relative movement between fence 28 and support members 34 and 36.

It should be understood that adjustability between fence 28 and support base 14 is most important to allow for varying widths of saw blades 12. This can be accomplished by having either slots in fence 28 or slots in support base leg 16. For example, slots 62 in support base leg 16 could be provided, but fence 28 could be provided with holes of sufficient diameter to allow passage of shanks 52. Holes could also be substituted for the slotted holes in clamps 34 and 36.

Springs 68 may also be provided for ease of insertion of the saw blade 12 into the welding jig 10. The springs 68 are located between clamping members 34 and 36 and fence 28. Springs 68 act to raise clamping members 34 and 36 and clamping edge 44 to create a space between clamping edge 44 and support surface 22 when wing nuts 60 are loosened. This allows the saw blade 12 to be inserted between clamping edge 44 and support surface 22 easily.

FIG. 3 is a sectional view of FIG. 1 taken along line 3—3 and shows a saw blade 12 held in position and also shows the shank 52 extending through wing nut 60. In this figure the spring 68 is compressed and head 54 of bolt 52 is flat against the undersurface 70 of support base leg 16.

It should be understood that additional clamps, identical to clamping members 34 and 36 could be used and the clamping members 34 and 36 could be spaced differently than are shown. It is further possible that fasteners 50 connecting fence 28 to the support base leg 16 could be eliminated, however a resulting loss in stability of the welding jig 10 would occur.

FIG. 4 shows a section view taking along line 4—4 of FIG. 1 at the recesses 46 and 48 of fence 28 and support base leg 16, respectively. Saw blade 12 rests on support surface 22 of support base leg 16 and is held in position by contacting front edge 26 of fence 28 and is retained on support surface 22 of support base leg 16 by clamping member 36 wherein clamping edge 44 engages saw blade 12.

OPERATION

To use the welding jig 10 the saw blade ends 30 and 32 are placed in an abutting or lapping along a proposed weld line 72. Weld line 72 is positioned at recesses 46 and 48 of fence 28 and support surface 22, respectively. The toothed edge of saw blade 12 extends outwardly from welding jig 10 and the flat edge of saw blade 12 abuts front edge 26 of fence 28 beneath the clamping edge 44 of each of clamps 34 and 36. As saw blade 12 is inserted clamps 34 and 36 are held above support surface 22 by springs 68. After saw blade 12 is inserted, wing nuts 60 are turned and tightened so that clamping edges 44 of clamps 34 and 36 tightly engage saw blade ends 30 and 32.

If it is determined that support surface 2 is not wide enough to securely support saw blade 12, then each of the fasteners 50 must be loosened and fence 28 can be slid away from front edge 24, thus creating a larger support surface 22. When the support surface 22 is properly sized, then fasteners 50 can be tightened and fence 28 can be resecured to support base leg 16. The fasteners 50 which do not extend through clamping members 34 and 36 are used to secure fence 28 to support base 14 and allow for adjustability of the clamping members and insertion and removal of saw blade 12 without affecting the size of support surface 22.

After the saw blade ends 30 and 32 have been joined, fasteners 50 which hold clamping members 34 and 36 in engagement with saw blade ends 30 and 32 can be released and saw blade 12 can be removed from welding jig 10.

All materials used are preferably metal such as iron or steel, but strong heat resistant plastics could also be used.

While this invention has been described as having a preferred device it is understood that it is capable of further modifications, uses and/or adaptations of the invention following in general the principle of the invention and including such departures from the present disclosure as come within known or customary practice in the art to which the invention pertains, and as may be applied to the central features hereinbefore set forth, and fall within the scope of the invention and the limits of the appended claims.

I claim:

1. A welding jig for butt welding together two parts of a workpiece, such as a saw blade, comprising:
    a) holding means for retaining a workpiece during repair;
    b) said holding means including a base means forming an elongated support including a first planar member;
    c) said first planar member having a front edge and a rear edge and a pair of ends;
    d) said holding means further including adjustable fence means supported on said first planar member and adjustable relative to said planar member for movement toward and away from said front edge;
    e) clamping means for holding a workpiece to said base means; and
    f) fastening means for releasably securing said clamping means and said fence means to said base means
    g) said fence means includes front and rear edges and a pair of ends; and,
    h) said fence means includes a welding recess on said front edge.

2. The welding jig as defined in claim 1, wherein:
    a) said planar member includes means thereon for adjusting said fence means.

3. The welding jig as defined in claim 2, wherein:
    a) said means for adjusting said fence means includes a plurality of parallel slots extending substantially perpendicular to said front edge.

4. The welding jig as defined in claim 1, wherein:
    a) said holding means includes means for adjusting said fence means relative to said planar member.

5. The welding jig as defined in claim 4, wherein:
    a) said means for adjusting said fence means includes a plurality of parallel slots;
    b) said fence means including a front edge; and c) said plurality of parallel slots extend substantially perpendicular to said front edge of said fence means.

6. The welding jig as defined in claim 6, wherein:
    a) said fence means includes a front edge;
    b) said planar member and said fence means each include adjusting means.

7. The welding jig as defined in claim 6, wherein:
    a) said adjustment means on said fence means and said planar member each include a plurality of slots; and b) said slots extend generally perpendicular to the front edges of each of said planar member and said fence means.

8. The welding jig as defined in claim 1, wherein:
a) said fence means includes a front edge extending substantially parallel to said front edge of said planar member;
b) said front edges of said fence means and said planar member each having a cooperating notch therein;
c) whereby, said notches allow spacing of a predetermined welding area from said holding means.

9. The welding jig as defined in claim 1, wherein:
a) said clamping means includes a plurality of clamps.

10. The welding jig as defined in claim 9, wherein:
a) each of said clamps is spring biased relative to said planar member and said fence means.

11. The welding jig as defined in claim 9, wherein:
a) said clamps are spaced from and located on either side of a predetermined welding area.

12. The welding jig as defined in claim 9, wherein:
a) each of said clamps includes an adjustable slot allowing sliding movement of each of said clamps relative to said fence means and said planar member.

13. The welding jig as defined in claim 1, wherein:
a) said planar member includes guide means formed therein;
b) said guide means includes a plurality of elongated slots extending substantially perpendicularly relative to said front edge; and,
c) said fastening means extends through said slots and provides an adjustable connection allowing said base means and said fence means to be moveable relative to each other.

* * * * *